US012778151B2

(12) United States Patent
Takahashi

(10) Patent No.: US 12,778,151 B2
(45) Date of Patent: Nov. 3, 2026

(54) MEAT AND OTHER FOOD SMOKER

(71) Applicant: IKEDA EMPRESARIAL LTDA., Marília (BR)

(72) Inventor: José Hajime Takahashi, Marília (BR)

( * ) Notice: Subject to any disclaimer, the term of this patent is extended or adjusted under 35 U.S.C. 154(b) by 1042 days.

(21) Appl. No.: 17/885,637

(22) Filed: Aug. 11, 2022

(65) Prior Publication Data

US 2023/0048016 A1 Feb. 16, 2023

(30) Foreign Application Priority Data

Aug. 12, 2021 (BR) ......................... 102021015941-3

(51) Int. Cl.
*A23B 4/052* (2006.01)
*A47J 37/07* (2006.01)

(52) U.S. Cl.
CPC ......... *A23B 4/0523* (2013.01); *A47J 37/0704* (2013.01); *A47J 37/0718* (2013.01)

(58) Field of Classification Search
None
See application file for complete search history.

(56) References Cited

U.S. PATENT DOCUMENTS

| | | | | |
|---|---|---|---|---|
| 4,700,618 | A * | 10/1987 | Cox, Jr. | A23B 4/052 99/481 |
| 6,187,359 | B1 * | 2/2001 | Zuccarini | A47J 37/0786 126/41 R |
| 9,339,145 | B1 * | 5/2016 | Owczarzak | A47J 37/0713 |
| 2006/0213497 | A1 * | 9/2006 | Orozco | A47J 37/0786 126/41 R |
| 2018/0368618 | A1 * | 12/2018 | Measom | A47J 37/0704 |

* cited by examiner

*Primary Examiner* — John J Norton

(57) ABSTRACT

A smoker for meats and other foods, belonging to the technical sector of barbecues and similar, of horizontal type, with displaced furnace and direct flow or vertical type smokers, is formed: by a smoking chamber and a furnace. The smoking chamber is formed by: a dividing plate; a lower chamber arranged in communication with the furnace; a smoking chamber itself; passages provided in the dividing plate through which the heated gases are fed into the smoking chamber itself; a set of grates disposed in different levels; and a chimney; the lower chamber is constituted by a plenum box, which maintains the static pressure of the heated gases homogeneous in its interior; the passages include alignments of deflector openings provided on the opposite sides of the dividing plate, selected to increase the speed with the formation of vortices and direct the heated gas fed into the smoking chamber itself.

12 Claims, 7 Drawing Sheets

MEAT AND OTHER FOOD SMOKER

CROSS REFERENCE TO RELATED APPLICATIONS

Applicant claims priority under 35 U.S.C. § 119 of Brazilian Application No. 102021015941-3 filed Aug. 12, 2021, the disclosure of which is incorporated by reference.

BACKGROUND OF THE INVENTION

1. Field of the Invention

This descriptive report refers to a patent application for a meat and other food smoker, belonging to the technical sector of barbecues and similar equipments, which was developed to provide, mainly, a more homogeneous temperature in the smoking process chamber and increased heat transfer from the hot gases to the food being prepared, in relation to those obtained with the usual similar smokers.

2. Description of the Related Art

A Meat and Food Smoker known, very popular in the United States of America, is known as "Pit Smoker" or simply "Smoker", which produces the so-called "American Barbecue", and which is now becoming increasingly popular in Brazil.

Several types of smokers with different constructive forms are known in the market, in which the flows of heated gases present different patterns. Thus, horizontal smokers are known, of the type with "displaced" furnace, "Off Set" (FIGS. 11,12), in which the heat source furnace is not aligned in relation to the food smoking chamber, and comprised by: a chamber 100; a furnace 101 (known as "Fire Box"), dislocated laterally and below the chamber 100; this chamber 100 comprises: a lower chamber 102 arranged in direct communication with furnace 101 and in which the hot gases generated in this furnace circulate by an upper smoking chamber 103; through the grids 104 internal to the smoking chamber 103 and on which the foodstuffs are supported; by a chimney 105 derived from smoke chamber 103; by dividing plate(s) 106 that separate(s) the lower gas circulation chamber 102 from the upper smoking chamber 103.

In one possible embodiment, this "Off Set" type horizontal smoker can be of "direct flow" (FIG. 11) when then the division between the lower 102 and upper 103 chambers is made by sheet (s) divider(s) 106, which define passages 107 for hot gases; and in another embodiment, the horizontal smoker "Off Set" is of the "Reverse Flow" type (FIG. 12), when then the division between the lower chambers 102 and the upper 103 is made by a dividing plate 106 that defines a single passage 107', located at the end of the lower chamber 102 opposite the inlet of hot gases supplied by the furnace 101, in which case said lower chamber 102 functions essentially as a duct.

In another embodiment, said smoker is of the vertical type (FIG. 13), in which the heat source is aligned with the food to be smoked, formed by: a vertical chamber 100' inside of which there are assembled, from bottom to top, a lower furnace 101'; an baffle plate 106'; hot gas passages 107"; upper smoking chamber 103' provided with grilles 104' and from which it derives the chimney 105'.

In the horizontal "Off Set" smokers (FIGS. 11,12), the heat and gases generated in the furnace 101 by burning coal/firewood are directed to the lower chamber 102 and then directed to the smoking chamber 103 itself through the hot gas passages 107, 107' defined by the dividing plate(s) 106.

In the horizontal type smokers, "Off Set", of direct flow (FIG. 11), the gases from the burning of fuels in the furnace 101 are directed to the lower chamber 102 and then through the openings 107, carefully positioned, sized in a progressive manner, enter the smoking chamber 103, cross through the food supported on the grids 104 and then exhausted through the chimney 105.

In these "Off Set" type smokers, of the type direct flow, despite of all these precautions, it is not possible to prevent the grids 104, where the food is deposited, located closer to the outlets 107 of the gases of the furnace 101, from reaching temperatures higher in relation to the other grids 104 further away from this outlet 107, thus causing a non-homogeneous temperatures and heat transfer distribution to the food in the smoking chamber 103.

In the reverse flow type of horizontal "Off Set" smokers (FIG. 12), the heated gases from the furnace 101 flow through the lower chamber 102, which in this case works simply as a channel duct, and only at the extremity end, said gases enter into the smoking chamber 103 through a passage 107', heat the food supported on the grates 104 and exit through the chimney 105, which is located in the region of the smoking chamber 103 opposite to that in which the inlet passage 107' of the gases is located.

In this case, during the course of the heated gases in the lower chamber 102, there is a gradual drop in temperature, until entering the smoking chamber 103 and this drop in temperature continues during the path of the gases already in the smoking chamber 103, until reaching the chimney 105, not allowing uniform temperatures inside the smoking chamber 103.

All smokers are equipped with internal steel sheets, such as plates and deflectors (not shown), with the objective of not letting the hot gases to reach directly the food, in order to get a better control of the internal temperature, keeping it more uniform and allowing a more adequate contact time of these gases with the foods to produce the best smoking effect, as can be seen in the notes (arrows) of the gas paths in the aforementioned FIGS. 11, 12, 13.

The control of the internal temperatures in the smoking chambers allows a slow burning and enables the transformation of fibers and collagens in the meats, making them softer, as recommended by the "Low and Slow" techniques (low temperature and slow smoking) that guide the "American Barbecue".

Two effects characterize this type of barbecue:

One is the so-called "smoking ring" (known as the "smoker ring"), which visually shows that the smoking process was well done. According to this effect, after a transversal cut in the meat, a darker peripheral layer can be seen, which can reach 8 mm in thickness, which shows the good penetration of smoke into the meat.

Another important effect in the "American Barbecue" is the "bark" effect (known as "Bark"), which makes the surface of smoked foods look similar to tree bark and provides its special flavors.

When these characteristics are obtained, they demonstrate the good quality of the smoking equipment, regardless of its shape or system.

It happens that all smokers on the market cannot produce these effects perfectly and adequately.

All the usual smoking equipment have "hotter" and "cooler" zones in the smoking chambers that make their operation more difficult, mainly requiring more frequent interventions by the operator, to change the position of the food, adjust valves and perform plate spacing in the grills to ensure more adequate cooking.

In addition, the heated gases move with low speed in the smoking chamber and this does not favor an adequate and efficient transmission of heat from these gases to the food.

It appears that the desirable "smoker ring" and "Bark" effects would be more feasible, if there were a more intense movement of gases inside the smoking chamber.

In the vertical smokers, despite of having deflectors and other possibilities such as the height adjustment of the internal grills for food and even the inclusion of water containers to uniformize and humidify the environment, the lower grills are exposed to higher temperatures than the others grills, repeating the uniformity deficiencies of the "Off Set" models; besides the movement of food grills in the vertical models are more difficult by the fact that one grill is placed on top of the other.

In conclusion, it is desirable to homogenize the temperature in the smoking chamber and improve the heat transfer efficiency from the heated gases to the food, keeping the temperature of these gases within a suitably low range for the smoking process.

SUMMARY OF THE INVENTION

The main objective of this Patent of Invention is to provide a smoker that overcomes the deficiencies observed in the usual smokers, particularly with regard to the lack of uniformity of the temperature in the smoking chamber and to the unsatisfactory heat transfer from the cooking gases to the food.

Another objective is to provide a smoker equipped with few internal elements that allow for greater uniformity of the internal temperatures of the smoking chamber and better heat transfer to the food being prepared, resulting in better quality smoked food products, reduced smoking time and fuel economy (firewood or coal).

Another objective is to provide a smoker that is easy to be operated by the user.

Another objective is to provide a smoker that, besides overcoming the technical problems of the usual smokers, is built or manufactured with very low level of complexity, that make it interesting compared to other usual smokers.

Another objective is to provide a smoker with very low acquisition, operation and maintenance costs.

Taking into consideration the aforementioned problems observed in the usual smokers, and in order to overcome them, while meeting the related mentioned objectives, the meat and other food smoker was developed, object of the present patent, which maintains the traditional basic geometries of known smokers, both in terms of the smoking chamber and the furnace; however it includes constructive details that provide the innovative concept of the aforementioned lower chamber, arranged under the smoking chamber, which does not have the function of a simple duct that transfers the gases from the furnace to the smoking chamber, as in the usual "Off Set" type horizontal smokers, but, in the present invention, said lower chamber has a construction that transforms it in a "plenum box" with characteristics to keep the inside static pressure of the gases homogeneous.

The present invention provides the openings that communicate this plenum box with the smoking chamber are designed and dimensioned in order to provide greater velocity in the gases that enter the smoking chamber; said openings, therefore, have significantly smaller dimensions compared to the equivalent openings of the usual horizontal "Off Set" direct flow smokers.

The present invention also provides for the fact that said openings, communicating the plenum box with the smoking chamber, are openings that is equipped with deflectors directing the flows of heated gases provided with a suitable arrangement and shape to generate vortices of hot gases with high velocities into the smoking chamber. The results of these vortices and high velocity hot gases are to uniformize the temperature inside the smoking chamber and optimize the process of heat transmission between the gases and the food. These eddies promote a better mixing of the gases inside the smoke chamber and together with higher velocities than the gas flows observed in the smoke chamber of usual smokers, they will promote an increased heat transfer efficiency between the gases and the food.

These constructive and functional characteristics of the present smoker contribute decisively to enhance the aforementioned "smoker ring" and "Bark" effects desirable in "American Barbecue".

In horizontal "Off Set" direct-flow smokers, it is usual that the openings between the lower chamber and the smoking chamber are positioned progressively, in such manner that these opening are smaller when they are closer to the furnace and larger by the end of the lower chamber, with the objective of distributing uniformly the flow of hot gases. Some of these openings are provided with plates (damper) that move laterally to achieve some regulation of this opening distribution. However, such recourses have shown unsatisfactory results. This is due to the fact that the lower chamber of such horizontal "Off Set" direct-flow smokers is not designed as a "plenum box" as it occurs in the present invention, therefore the said usual lower chamber does not promote an uniform flow of hot gases to the smoking chamber; as the consequence the smoking chamber will present a non-uniform temperature distribution and the lower velocity of hot gases in the smoking chamber, that will result in a decreased efficiency of heat exchange between gases and food This smoker construction proposed in the present invention, therefore, overcomes the problems and limitations of the state-of-the-art direct flow horizontal "Off Set" smoker.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
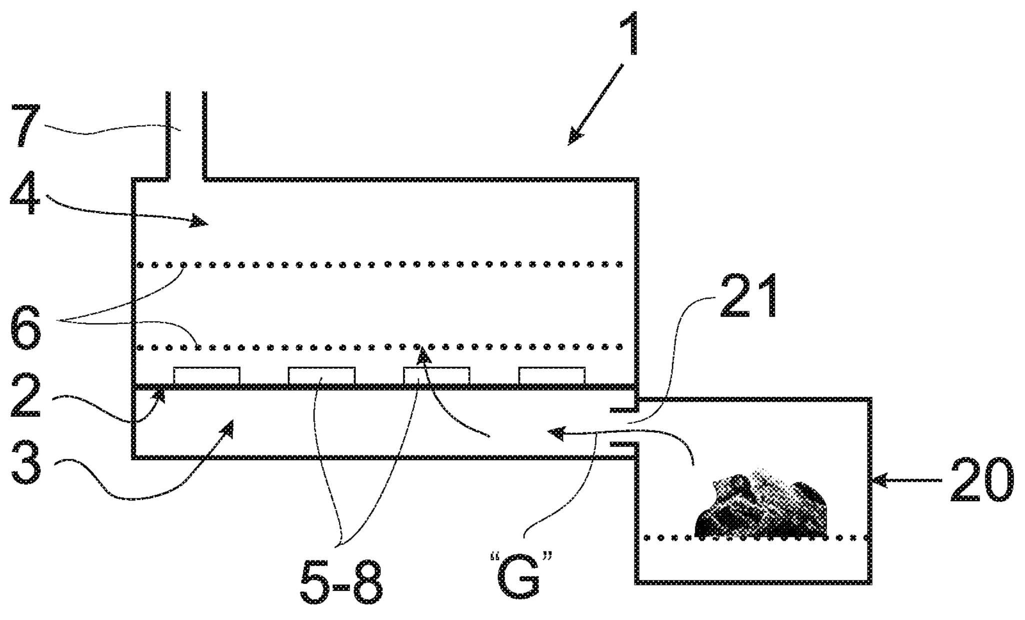
FIGS. 1 and 2 show schematics of the smoker according to the invention, in a horizontal version, with a direct-flow offset furnace (Off Set) and a vertical version, respectively.
Figure 2:
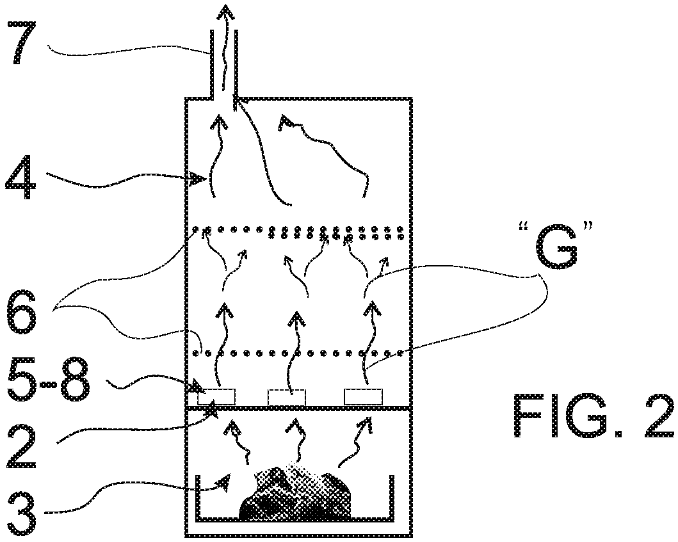
Figure 3:
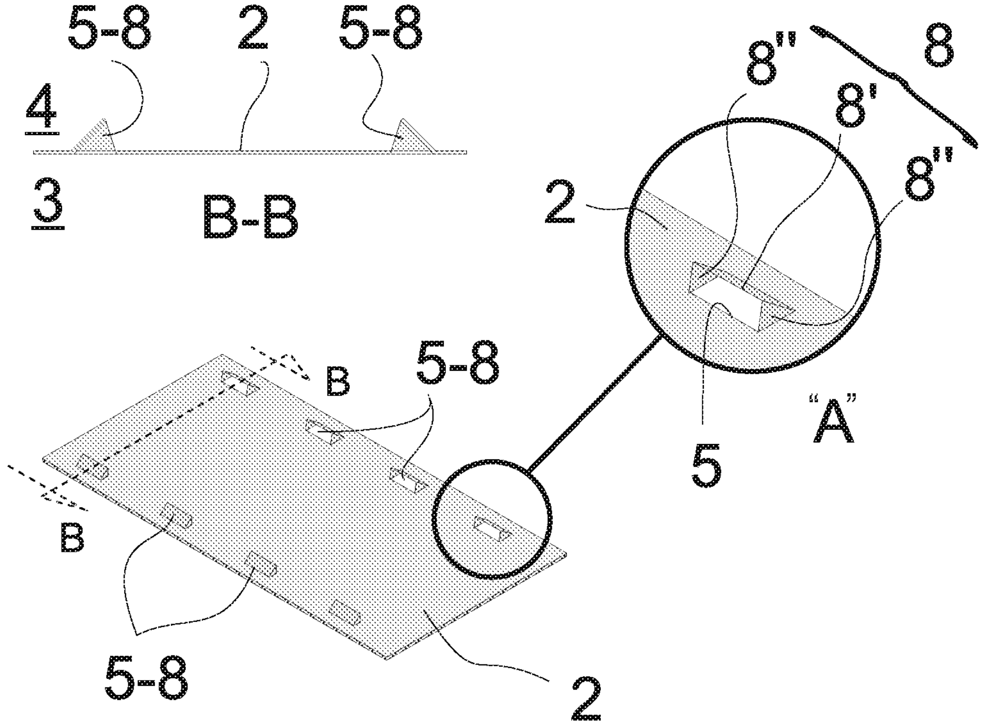
FIGS. 3 to 6 show various possibilities of accomplishing a main shape of the dividing plate 2, which divides the plenum box 3 from the smoking chamber itself 4, according to the present invention, emphasizing the deflector openings 5-8 provided in such partition plate 2.
Figure 4:
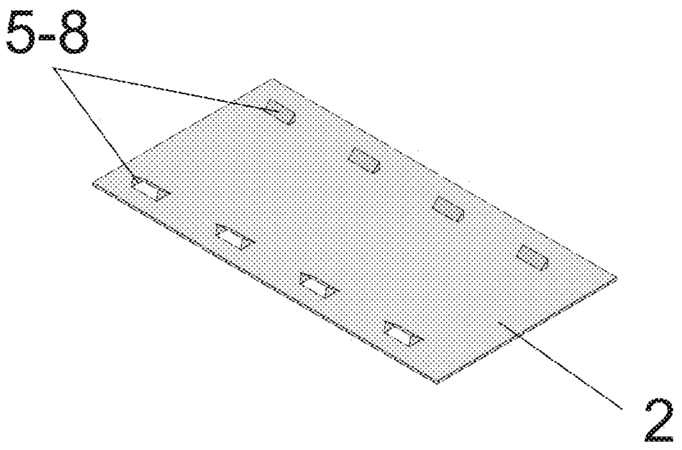
Figure 5:
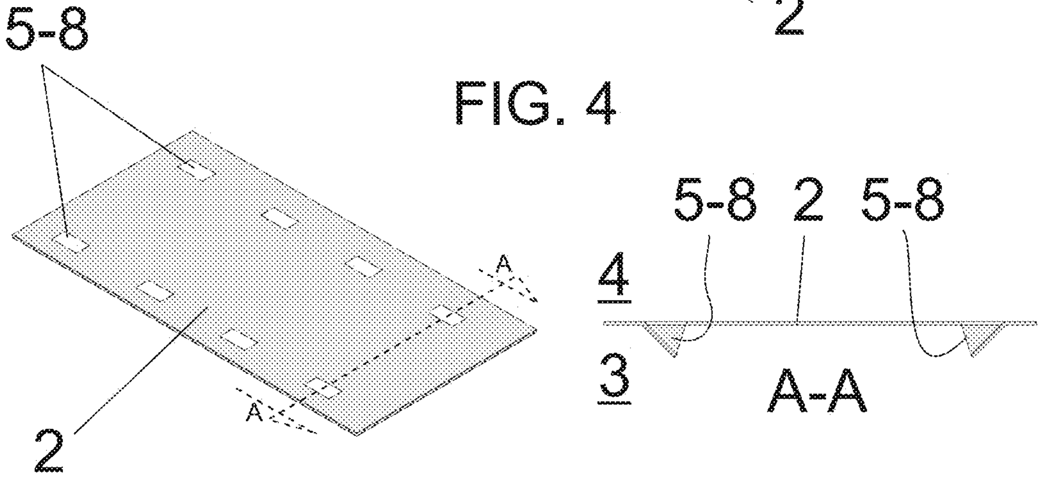

As illustrated in the figures above and provided for in the invention, the smoker (FIGS. 1 to 10), object of the present invention, is intended to smoke meat and other foods and can be of a horizontal type, with offset furnace (Off Set), of the types direct flow and reverse flow (FIG. 1, 7) or vertical type (FIG. 2).

The horizontal smoker, with displaced furnace (Off Set), of the direct flow type (FIGS. 1, 7), is formed by usual components, essentially comprising: a horizontal smoking chamber 1; and by a furnace 20 displaced laterally and below the horizontal smoking chamber 1, and they communicate each other through a passage 21, through which the heated gases “G” circulate, such hot gases are fed from the furnace 20 into the smoking chamber 1. The smoking chamber 1 is constituted by: a dividing plate 2; the lower chamber 3 formed under the dividing plate 2, in which the passage 21 for feeding the heated gases “G” are arranged; the smoking chamber itself 4 formed above the dividing plate 2; the passages 5, provided in the dividing plate 2 and through which the heated gases “G” are fed from the lower chamber 3 to the smoking chamber itself 4; two sets of grids 6 are assembled in two levels, inside the smoking chamber itself 4, over which the meet and food are lay down; and a chimney 7 derived from the smoking chamber itself 4; said smoking chamber itself 4 is also provided with doors for the operator to access its interior, and optionally ventilation adjustment devices (dampers) and others openings are arranged, which are not illustrated.

In the present invention the main object to be protected in the present patent, is constituted of three constructive details, that when incorporated in the smokers, provide a homogenization of the temperature inside the smoking chamber itself 4 and a better heat transfer from the heated gases “G” to the food being smoked. The first constructive detail consists in the fact that instead of the lower chamber 3 being constructed to have the function only of a duct or duct and gas diffuser through which the heated gases “G” circulate, as usually occurs in smokers, said lower chamber 3, in the present invention, is a plenum box 3, with shapes and dimensions (geometry) selected, to have the capacity to supply heated gases “G” from the furnace 20 to the smoking chamber 4, through the uniquely designed passages 5 of heated gases “G”, while it maintains the static pressure of the heated gases “G” uniform and constant, inside said plenum box 3.

The second constructive detail consists in the fact that the passages 5, between the plenum box 3 and the smoking chamber itself 4, are comprised of sets of deflector openings 5-8 (FIGS. 3 to 6), aligned on the opposite sides of the dividing plate 2. Each deflector opening 5-8 is formed by an opening 5 made in the dividing plate 2, provided with a dimension substantially smaller than the corresponding passages provided in the usual horizontal smoker, with displaced furnace or in the usual direct flow horizontal smoker, in order to provide an increase in the velocity of the heated gases “G” flow in the circulation between the plenum box 3 and the smoking chamber itself 4; such a openings 5 of the deflector openings 5-8 have a dimension and geometry selected by considering the thermodynamic conditions of the heated gas flow “G”, which increase the flow speed of the gas into the smoking chamber itself 4, and promote a formation of vortices on the end edge of these defectors.

The third constructive detail consists in the fact that each deflector opening 5-8 is equipped with a deflector 8 that directs the flow of heated gas “G” in an inclined angle relative to the horizontal plane of the partition plate 2, so that the streams of heated gas “G” provided by said deflector openings 5-8 are fed obliquely into the smoke chamber itself 4, causing such streams of heated gas “G” to collide each other and/or with surfaces of the actual smoking chamber 4, forming and intensifying the so called in this report, as the “Vortex Effect” of heated gas “G” inside the actual smoking chamber 4 and between the grates 6. Such a gas with higher velocity and vortices increases the mixture of streams of hot gases and the circulation time of the heated gases “G” inside the smoking chamber itself 4 and between the grates 6; the final resulting effects are the increasing homogenization of the temperature of the heated gases “G” inside the smoking chamber itself 4 and between the grates 6, and also the increasing in the heat transfer efficiency of said heated gases “G” to the food that are being smoked.

Figure 6:
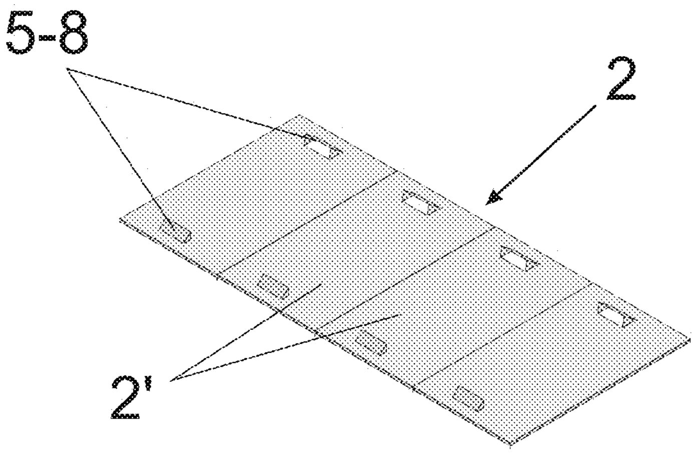
Figure 7:
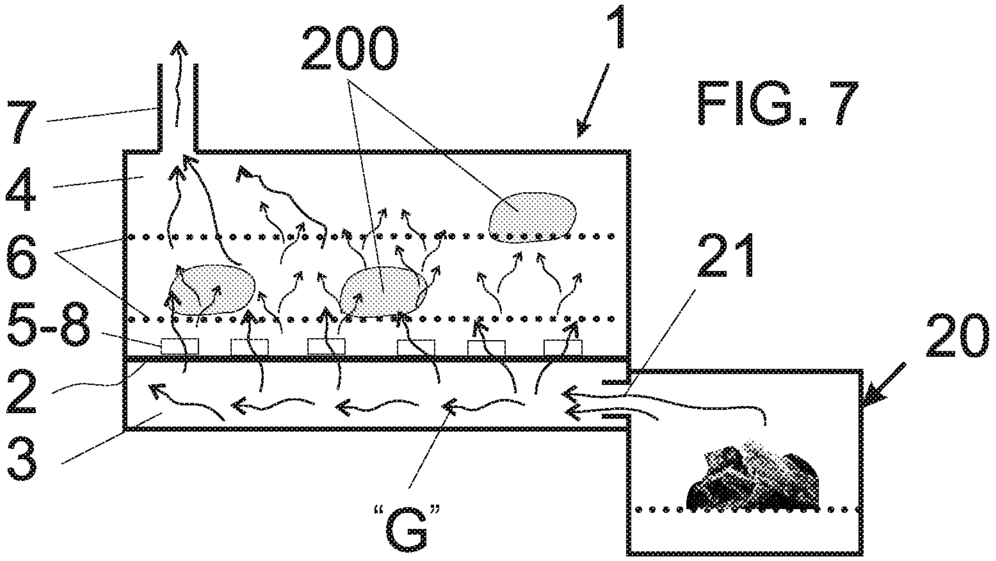
FIG. 7 shows a schematic of the horizontal smoker, with displaced furnace, of the type direct flow, according to the present invention and the indication of operation.
Figure 8A:
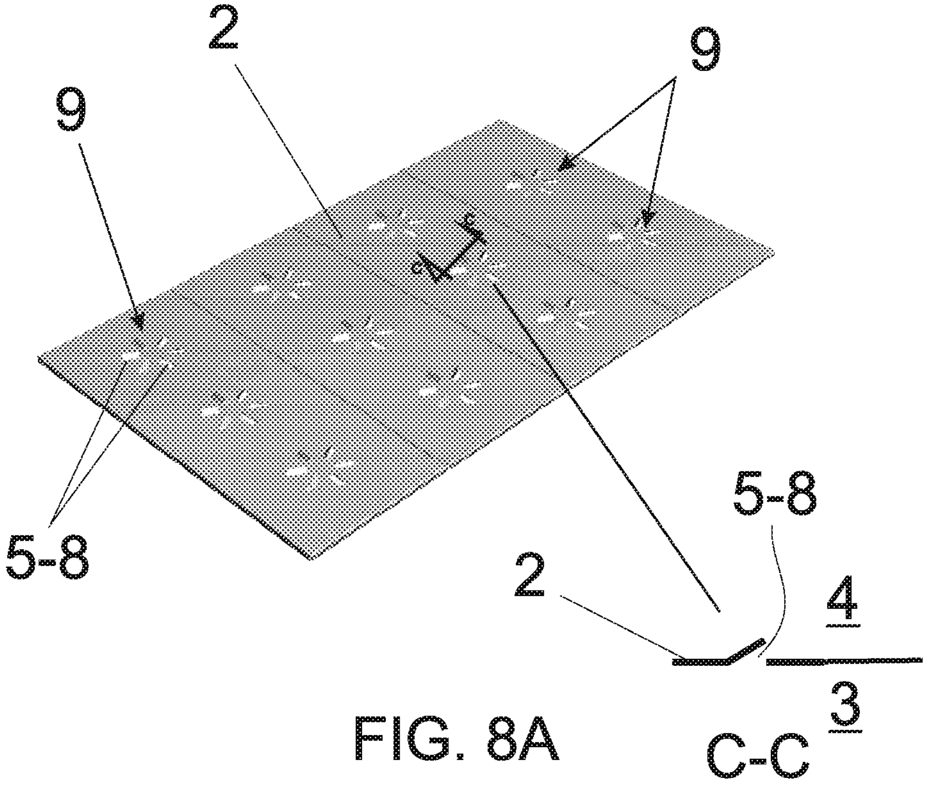
FIGS. 8A, 8B, 9, and 10 show other possibilities for implementing the dividing plate 2.
Figure 8B:
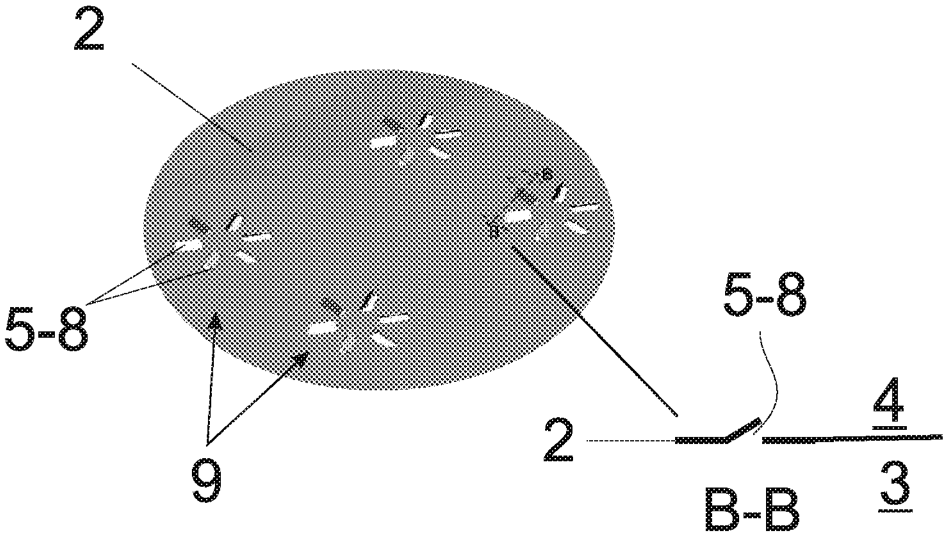
Figure 9:
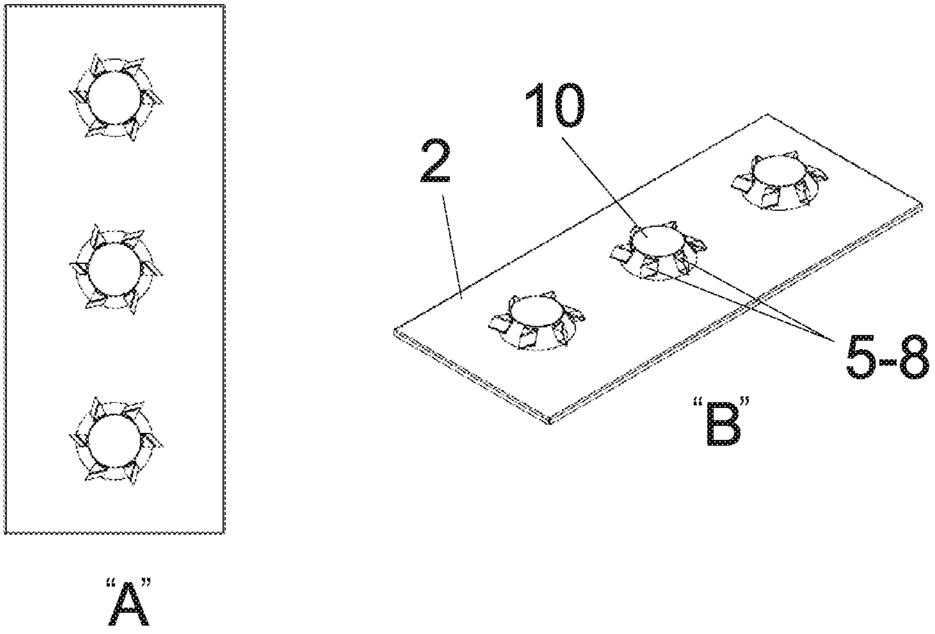
Figure 10:
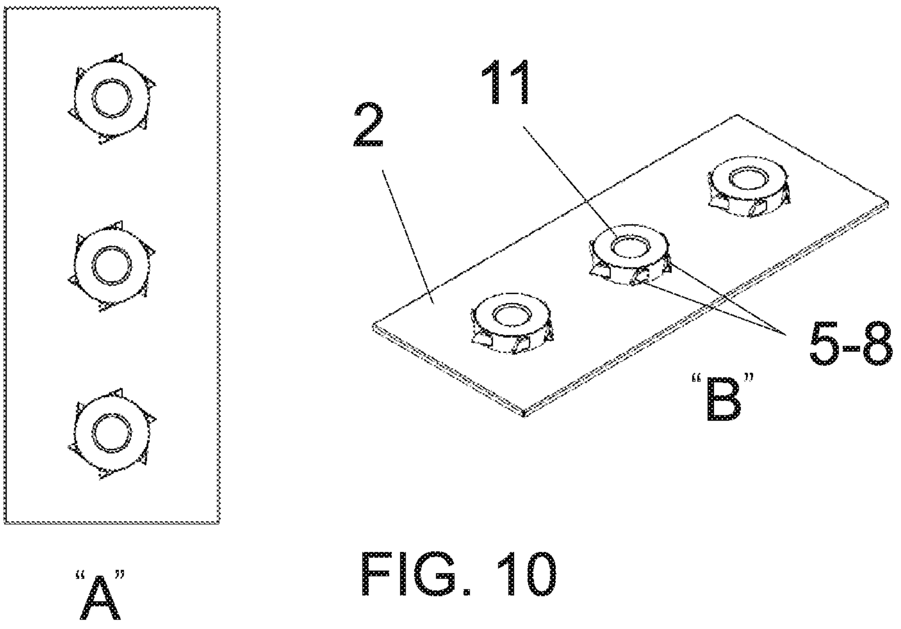
Figure 11:
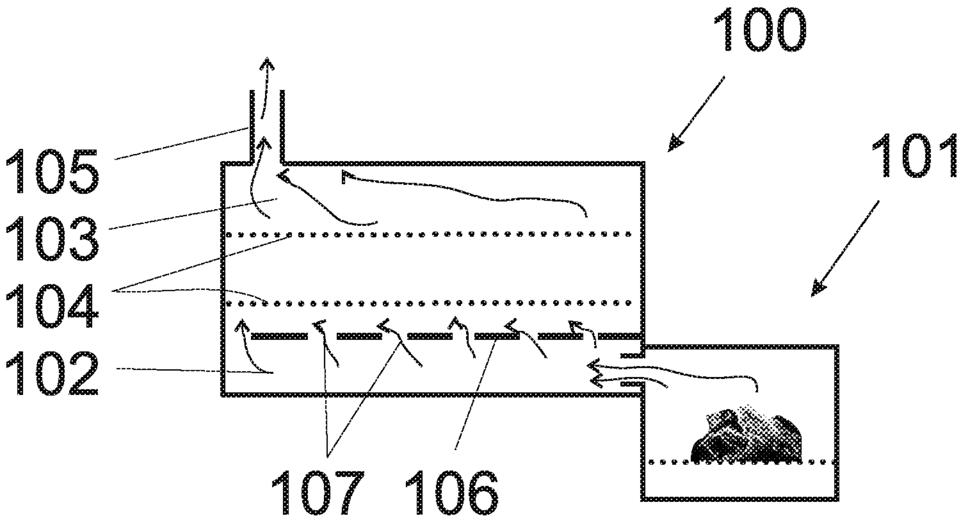
PRIOR ART FIG. 11
FIGS. 11 to 13 show three possibilities for the realization of conventional smokers: of the horizontal type with a displaced furnace (Off Set) of direct flow; of the horizontal type with offset furnace (Off Set) of reverse flow; and the vertical type, respectively.
Figure 12:
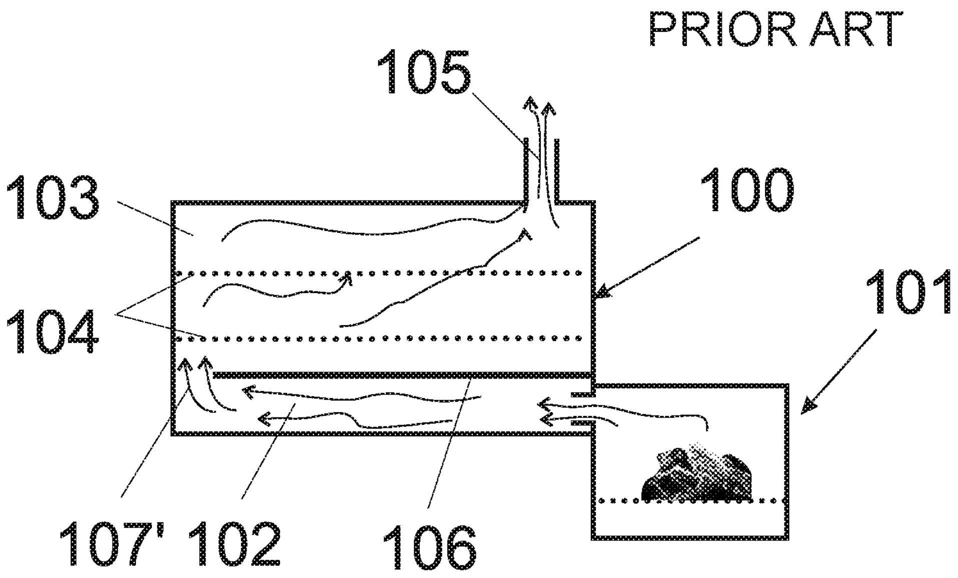
Figure 13:
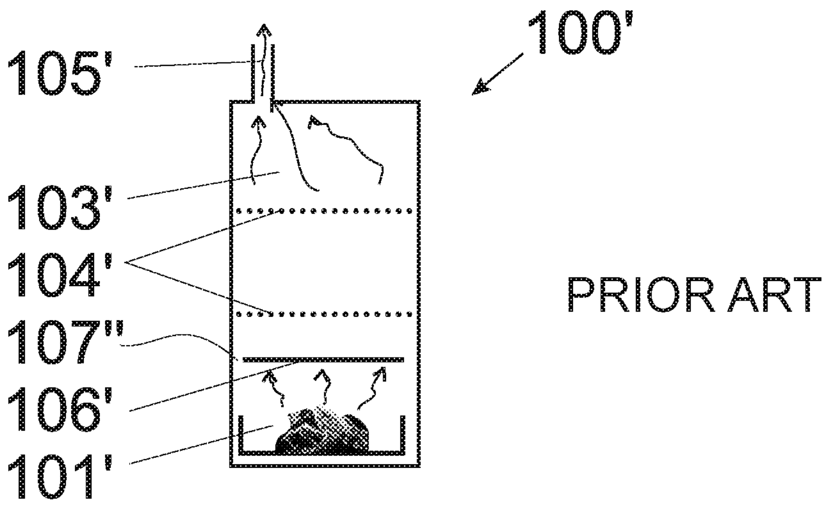

Specifying in details, a possible embodiment (FIG. 3) of each deflector opening 5-8, is formed by a rectangular opening 5 practiced in the plane of the dividing plate 2, which defines the gas entrance into the deflector opening 5-8; said deflector opening 5-8 is also comprised of a pyramidal deflector 8, formed (FIG. 3—detail A): by an oblique upper section 8' extended from the one side of the rectangular opening 5, parallel to the adjacent edge of the dividing plate 2, and whose opposite free edge, of said oblique portion 8', is vertically aligned with the opposite edge of the rectangular opening 5; said pyramidal deflector 8 formed by sections of lateral triangular closures 8", thus defining, said pyramidal deflector 8, a vertical rectangular outlet of the deflector opening 5-8, which is orthogonal to the plate plane divider 2. In one embodiment (FIG. 3), the divider plate 2 has two opposing alignments of sets of deflector openings 5-8, each set alignment disposed adjacent to the respective side of divider plate 2; each deflector aperture 5-8 of one of the set of deflector alignment and the corresponding deflector opening 5-8 of the set of deflector alignment of the opposite side of the divider plate, can be arranged in order that both the deflecting openings 5-8 are with the outlets facing the central region of the dividing plate 2. In another possibility of realization (FIG. 4), the deflector openings 5-8 have the outlets facing to the edges of the dividing plate 2 adjacent to respective set of deflector alignment. The deflector openings 5-8 described above have the deflector 8 projecting from the upper face of the dividing plate 2 to the direction of the smoking chamber itself 4 (downstream position of the deflector 8). In another embodiment, however, the deflector 8 of said deflector openings 5-8 can project from the underside of the dividing plate 2 (FIGS. 5A, 5B) in the direction of the plenum box 3 (upstream position of the deflector 8), in which case the opening defined by the deflector 8, orthogonal to the dividing plate 2, is the gas inlet and the opening 5 provided in the plane of the dividing plate 2, is the outlet of the heated gases “G”. The dividing plate 2 can be a single piece, according to FIGS. 3 to 5 or alternatively, it can be formed in modules by sections of adjacent plates 2', each one equipped with two opposing lines of sets of deflectors pr single deflector openings 5-8 (FIG. 6).

Thus, in the smoker in operation (FIG. 7), the furnace 20 is fed with fuel (coal, wood), burns it and generates the heated gases “G”, which flows through the opening 21, are fed into the plenum box 3. The dimensioning of the plenum box 3 is realized taking into consideration that the capacity of the furnace 20 to generate heated gas "G", and the capacity of the set of deflector openings 5-8 to supply the necessary heated gases "G" in the smoking chamber itself 4, will provide a maintenance of the plenum box with constant and uniform static pressure. The smaller dimension of the deflector openings 5-8 proposed, in comparison to the corresponding openings of the horizontal smokers, of the type displaced furnace, of flow direct type, provides a greater velocity of the heated gases "G" that are fed from the plenum box 3 to the smoking chamber itself 4. In addition, the deflectors 8 of the deflector openings 5-8 direct the heated gases "G" from different modes, according to the orientation of said deflector openings 5-8, but they are all suitable ways to generate the eddies and vortices of heated gases "G" inside the smoking chamber itself 4 and between the grids 6 that support the food 200, thus increasing the homogenization of the gas temperature, and the circulation time of the heated gases "G" and an increased heat transfer efficiency from these to the food 200. The deflector openings 5-8 oriented towards the center of the dividing plate 2 (FIG. 3) cause the flows of heated gases "G" from the deflector openings 5-8 of one of the alignments of set of opening to collide with the flows from opposite side alignment of set of opening 5-8, thus causing the "Vortex Effect" of mixing of heated gas "G". The deflector openings 5-8 oriented towards the periphery of the dividing plate 2 (FIG. 4) cause the flows of heated gases "G" to collide with the walls of the smoking chamber itself 4, thus causing the "Vortex Effect" of mixing of heated gas "G".

For the purposes of this report, the so-called "Vortex Effect" of heated gas "G", which produces temperature uniformity in the smoking chamber itself 4 and greater efficiency in the heat exchange between the heated gas "G" and foods 200, consists of an "erratic" circulation of the heated gas "G" with higher gas velocities, in the smoking chamber itself 4 and between the grills 6, without the aid of any mechanical ventilation, but only increasing its local velocities and directing it properly through the deflector openings 5-8, which connects the smoking chamber itself 4 and the plenum box 3, just due to a higher and homogeneous static pressure generate inside the plenum box.

Within the basic construction details, for the usual smokers, described above, object of the present patent, can present modifications related to materials, dimensions, constructive details and/or functional and/or esthetics configuration, without departing from the scope of the requested protection.

Within the usual smokers, the present invention can be applied for the vertical smoker configuration, in which the heat source is in line with the food to be smoked (FIG. 2). In this case, said smoker is understood as a vertical chamber, which consists of, described from the bottom to the top by: a plenum box 3 that contains the furnace; a dividing plate 2; deflector openings 5-8 provided in the dividing plate 2; a smoking chamber itself 4; grids to support the food 6; and by an upper chimney 7 provided for the smoking chamber itself 4.

The dividing plate 2 can be rectangular, integral or modular, formed by sections of plate, (FIG. 8A) or circular (FIG. 8B) and sets 9 of the deflector openings 5-8, which can be arranged evenly distributed by the area of the dividing plate 2, each set 9 formed of a number of deflector openings 5-8 arranged radially and regularly spaced, giving the set 9 a circular contour.

In another embodiment, the dividing plate 2 can have a set of stamping, conical trunks 10 (FIG. 9) or cylindrical 11 (FIG. 10), whose side walls are provided with deflector openings 5-8, arranged radially and evenly spaced.

In order to meet the intended effects for the present smoker, that is, uniformity of the internal temperature and greater efficiency of heat exchange between the heated gas "G" and the foods 200 to be smoked in the smoking chamber itself 4. The dimensions and geometry of the plenum box 3, the sizing of the opening 5 in the deflector openings 5-8, the geometry and inclination of deflector 8 of the deflector opening 5-8, are essentially determined as a function of the thermodynamic conditions of the heated gas "G", provided by the burning capacity of the furnace 20 and the speed of the gas flow through the opening to the plenum box, and by the configuration and load capacity of food 200 desired to cook in the smoking chamber itself 4.

Although only a few embodiments of the present invention have been shown and described, it is to be understood that many changes and modifications may be made thereunto without departing from the spirit and scope of the invention.

What is claimed is:

1. A smoker for meat and other foods, of a horizontal type, formed by:
- a horizontal smoking chamber;
- a furnace displaced laterally and below the horizontal smoking chamber and communicating with the horizontal smoking chamber through a passage, through which heated gases circulate;
- wherein said horizontal smoking chamber is constituted by:
- a dividing plate;
- a lower chamber arranged under the dividing plate, in which the passage to feed the heated gases is opened;
- a smoking chamber itself arranged above the dividing plate;
- passages provided in the dividing plate and through which the heated gases are fed from the lower chamber to the smoking chamber itself;
- sets of grids assembled in different levels in the smoking chamber itself, over which the meat and food are laid down; and
- a chimney derived from the smoking chamber itself;
- wherein the lower chamber constitutes a plenum box, with shapes and dimensions selected to maintain the static pressure of the heated gases in an interior of the plenum box uniform and constant;
- wherein the passages between the plenum box and the smoking chamber itself comprise sets of deflector openings, aligned on the opposite sides of the dividing plate;
- wherein each deflector opening is formed by an opening made in the dividing plate, with a selected dimension in order to provide an increased speed of feeding the heated gas in the smoking chamber itself;
- wherein each deflector opening is formed by a rectangular opening made in the plane of the dividing plate wherein the rectangular opening defines the entrance of the deflector opening and by a pyramidal deflector formed by an oblique upper section extended from one side of the rectangular opening parallel to the adjacent edge of the dividing plate and whose opposite free edge of said oblique section is vertically aligned to the opposite edge of the rectangular opening;
- wherein said pyramidal deflector is also formed by sections of lateral triangular closures, thus defining in said pyramidal deflector, a vertical rectangular outlet of the deflector opening; and wherein the pyramidal deflectors direct the flow of heated gas in an inclined angle direction in relation to the horizontal plane of the dividing plate, so that the streams of heated gas are fed obliquely and with high speed into the smoking chamber itself and collide with each other and/or with surfaces of the smoking chamber itself, generating and intensifying a vortex effect that increases the mixture of hot gas streams, resulting in the homogenization of the temperature of the hot gases and the increase of the heat transfer efficiency of said heated gases for the food being smoked.

2. The smoker according to claim 1, comprising two opposing alignments of sets of deflector openings, each set alignment disposed adjacently to the respective side of the dividing plate, in order that each deflecting opening of one of the alignments is arranged in line with the corresponding deflector opening of the opposite side alignment.

3. The smoker according to claim 1, wherein the deflector openings have outlets facing the central region of the dividing plate or facing the edges of the dividing plate adjacent to said deflector openings.

4. The smoker according to claim 1, wherein the deflector openings have the deflector projected from the upper face of the dividing plate facing the smoking chamber itself for projecting from the underside of the dividing plate facing the plenum box.

5. The smoker according to claim 1, wherein the dividing plate is integral or modularly formed by sections of adjacent plates, each one equipped with two deflector openings opposite one another.

6. A smoker for meat and other foods, of a horizontal type, formed by:

a horizontal smoking chamber;

a furnace displaced laterally and below the horizontal smoking chamber and communicating with the horizontal smoking chamber through a passage, through which heated gases circulate;

wherein said horizontal smoking chamber is constituted by:

a dividing plate;

a lower chamber arranged under the dividing plate, in which the passage to feed the heated gases is opened;

a smoking chamber itself arranged above the dividing plate;

passages provided in the dividing plate and through which the heated gases are fed from the lower chamber to the smoking chamber itself;

sets of grids assembled in different levels in the smoking chamber itself, over which the meat and food are laid down;

a chimney derived from the smoking chamber itself; and a set of projections stamped on the dividing plate with a configuration of a conical trunks or cylindrical trunks construction, whose side walls are provided with deflector openings, arranged radially or inclined relative to a radial direction and evenly spaced:

wherein the lower chamber constitutes a plenum box, with shapes and dimensions selected to maintain the static pressure of the heated gases in an interior of the plenum box uniform and constant;

wherein the passages between the plenum box and the smoking chamber itself comprise sets of the deflector openings aligned on the opposite sides of the dividing plate;

wherein each deflector opening is formed by an opening made in the dividing plate with a selected dimension in order to provide an increased speed of feeding the heated gas in the smoking chamber itself; and wherein a deflector of each deflector opening directs the flow of heated gas in an inclined angle direction in relation to the horizontal plane of the dividing plate so that the streams of heated gas are fed obliquely and with high speed into the smoking chamber itself and collide with each other and/or with surfaces of the smoking chamber itself, generating and intensifying a vortex effect that increases the mixture of hot gas streams, resulting in the homogenization of the temperature of the hot gases and the increase of the heat transfer efficiency of said heated gases for the food being smoked.

7. A smoker for meat and other foods, of a vertical type, formed by:

a vertical smoking chamber;

a furnace displaced laterally and below the vertical smoking chamber and communicating with the vertical smoking chamber through a passage, through which heated gases circulate;

wherein said vertical smoking chamber is constituted by:

a dividing plate;

a lower chamber arranged under the dividing plate, in which the passage to feed the heated gases is opened;

a smoking chamber itself arranged above the dividing plate;

passages provided in the dividing plate and through which the heated gases are fed from the lower chamber to the smoking chamber itself;

sets of grids assembled in different levels in the smoking chamber itself, over which the meat and food are laid down; and an upper chimney derived from the smoking chamber itself;

wherein the lower chamber constitutes a plenum box, with shapes and dimensions selected to maintain the static pressure of the heated gases in an interior of the plenum box uniform and constant;

wherein the passages between the plenum box and the smoking chamber itself comprise sets of deflector openings aligned on the opposite sides of the dividing plate;

wherein each deflector opening is formed by an opening made in the dividing plate with a selected dimension in order to provide an increased speed of feeding the heated gas in the smoking chamber itself;

wherein the smoker comprises from bottom to top; the plenum box that contains the furnace; the dividing plate; the deflector openings provided in the dividing plate; the smoking chamber; the sets of grids; and the upper chimney;

wherein each deflector opening is formed by a rectangular opening made in the plane of the dividing plate wherein the rectangular opening defines the entrance of the deflector opening and by a pyramidal deflector formed by an oblique upper section extended from one side of the rectangular opening parallel to the adjacent edge of the dividing plate and whose opposite free edge of said oblique section is vertically aligned to the opposite edge of the rectangular opening;

wherein said pyramidal deflector is also formed by sections of lateral triangular closures, thus defining in said pyramidal deflector, a vertical rectangular outlet of the deflector opening; and wherein the pyramidal deflectors direct the flow of heated gas in an inclined angle direction in relation to the horizontal plane of the dividing plate so that the streams of heated gas are fed obliquely and with high speed into the smoking chamber itself and collide with each other and/or with surfaces of the smoking chamber itself, generating and intensifying a vortex effect that increases the mixture of hot gas streams, resulting in the homogenization of the temperature of the hot gases and the increase of the heat transfer efficiency of said heated gases for the food being smoked.

8. The smoker according to claim 7, comprising two opposing alignments of sets of deflector openings, each set alignment disposed adjacently to the respective side of the dividing plate in order that each deflecting opening of one of the alignments is arranged in line with the corresponding deflector opening of the opposite side alignment.

9. The smoker according to claim 7, wherein the deflector openings have outlets facing the central region of the dividing plate or facing the edges of the dividing plate adjacent to said deflector openings.

10. The smoker according to claim 7, wherein the deflector openings have the deflector projected from the upper face of the dividing plate facing the smoking chamber itself or projecting from the underside of the dividing plate facing the plenum box.

11. The smoker according to claim 7, wherein the dividing plate is integral or modularly formed by sections of adjacent plates, each one equipped with two deflector openings opposite one another.

12. A smoker for meat and other foods, of a vertical type, formed by:

a vertical smoking chamber;

a furnace displaced laterally and below the vertical smoking chamber and communicating with the vertical smoking chamber through a passage, through which heated gases circulate;

wherein said vertical smoking chamber is constituted by:

a dividing plate;

a lower chamber arranged under the dividing plate, in which the passage to feed the heated gases is opened;

a smoking chamber itself arranged above the dividing plate;

passages provided in the dividing plate and through which the heated gases are fed from the lower chamber to the smoking chamber itself;

sets of grids assembled in different levels in the smoking chamber itself, over which the meat and food are laid down;

an upper chimney derived from the smoking chamber itself;

a set of projections stamped on the dividing plate with a configuration of a conical trunks or cylindrical trunks construction, whose side walls are provided with deflector openings arranged radially or inclined relative to a radial direction and evenly spaced:

wherein the lower chamber constitutes a plenum box, with shapes and dimensions selected to maintain the static pressure of the heated gases in an interior of the plenum box uniform and constant;

wherein the passages between the plenum box and the smoking chamber itself comprise sets of the deflector openings aligned on the opposite sides of the dividing plate;

wherein each deflector opening is formed by an opening made in the dividing plate with a selected dimension in order to provide an increased speed of feeding the heated gas in the smoking chamber itself;

wherein a deflector of each deflector opening directs the flow of heated gas in an inclined angle direction in relation to the horizontal plane of the dividing plate so that the streams of heated gas are fed obliquely and with high speed into the smoking chamber itself and collide with each other and/or with surfaces of the smoking chamber itself, generating and intensifying a vortex effect that increases the mixture of hot gas streams, resulting in the homogenization of the temperature of the hot gases and the increase of the heat transfer efficiency of said heated gases for the food being smoked; and wherein the smoker comprises from bottom to top; the plenum box that contains the furnace; the dividing plate; the deflector openings provided in the dividing plate; the smoking chamber; the sets of grids; and the upper chimney.

* * * * *